(12) United States Patent
Fukazawa et al.

(10) Patent No.: US 7,401,673 B2
(45) Date of Patent: Jul. 22, 2008

(54) FRAME STRUCTURE FOR CONSTRUCTION MACHINE

(75) Inventors: Kazumasa Fukazawa, Komatsu (JP); Masayuki Mukaino, Chattanooga, TN (US); David Andrews, Chattanooga, TN (US)

(73) Assignee: Komatsu Ltd., Tokyo (JP)

( * ) Notice: Subject to any disclaimer, the term of this patent is extended or adjusted under 35 U.S.C. 154(b) by 352 days.

(21) Appl. No.: 11/226,467

(22) Filed: Sep. 15, 2005

(65) Prior Publication Data

US 2007/0056786 A1    Mar. 15, 2007

(51) Int. Cl.
B62D 33/06    (2006.01)

(52) U.S. Cl. .................................. 180/89.12

(58) Field of Classification Search ............... 180/89.1, 180/89.12, 311, 312, 299
See application file for complete search history.

(56) References Cited

U.S. PATENT DOCUMENTS

| | | | |
|---|---|---|---|
| 3,895,728 A * | 7/1975 | Heggen | 414/697 |
| 3,995,755 A * | 12/1976 | Wagner | 414/697 |
| 6,098,739 A * | 8/2000 | Anderson et al. | 180/312 |
| 6,158,525 A | 12/2000 | Inoue | |
| 6,293,364 B1 * | 9/2001 | Anderson et al. | 180/312 |
| 7,156,200 B2 * | 1/2007 | Dershem et al. | 180/311 |
| 2001/0050495 A1 | 12/2001 | Sorensen et al. | |
| 2002/0153190 A1 * | 10/2002 | Iwaki | 180/311 |
| 2004/0026153 A1 * | 2/2004 | Dershem et al. | 180/311 |
| 2004/0240976 A1 | 12/2004 | Otsuka et al. | |

FOREIGN PATENT DOCUMENTS

| | | |
|---|---|---|
| DE | 2019584 | 11/1971 |
| EP | 0958996 A1 | 11/1999 |
| EP | 1147947 A2 | 10/2001 |
| EP | 1162117 | 12/2001 |
| GB | 1310485 | 3/1973 |
| JP | H02-088877 | 7/1990 |
| JP | H06-049284 | 7/1994 |
| JP | 2000-027229 | 11/1999 |
| JP | 2004-360232 | 12/2004 |

* cited by examiner

Primary Examiner—Faye M. Fleming
(74) Attorney, Agent, or Firm—Barnes & Thornburg LLP

(57) ABSTRACT

A bulldozer is provided with a boat shaped main frame and a substantially U-shaped gate frame as a frame structure that mounts a cap having a rollover protection structure (ROPS) and forms the skeleton of the bulldozer. The gate frame is installed on the upper portion of the main frame, has a pair of left and right columns that are disposed along a substantially vertical direction, and has a beam that connects the upper ends thereof. Mount units for mounting the cab and stopper units for firmly grasping the cab are arranged on the upper surface of the beam.

11 Claims, 7 Drawing Sheets

FRAME STRUCTURE FOR CONSTRUCTION MACHINE

BACKGROUND OF THE INVENTION

1. Field of the Invention

The present invention relates to a frame structure of a construction machine such as a bulldozer or the like.

2. Background Information

In a conventional construction machine such as a bulldozer or the like, a boat-shaped main frame has various components mounted thereon, such as a slant nose, a track frame, a tank frame, a cab, and the like.

For example, Patent Document 1 discloses a main frame structure for a construction machine in which a pair of left and right main frames are constructed with a single thin straight plate disposed along the longitudinal direction of a vehicle, hollow pillar members are fixed to the left and right outer surfaces thereof, and the positions of the column members are in substantially the same plane as the position of a cross member that pivotably supports an equalizer bar.

[Patent Document 1]

Japanese Utility Model Application Publication 2000-027229 (published Jan. 25, 2000)

[Patent Document 2]

Japanese Utility Model Application Publication H06-049284 (published Jul. 5, 1994)

[Patent Document 3]

Japanese Patent Application Publication H02-088877 (published Jul. 13, 1990)

However, the conventional frame structure for a construction machine described above has the following problems.

In other words, with the frame structure of the construction machine disclosed in the aforementioned patent applications, it cannot be assumed that a cab having a rollover protective structure (ROPS) is mounted thereon. Because of this, it will be necessary to ensure that there is space to dispose the necessary mount units, stopper units, or the like on the individual main frames when a cab having a ROPS is to be mounted thereon.

An object of the present invention is to provide a frame structure of a construction machine that can ensure the necessary space on the frame in order to mount a cab having a rollover protective structure and thereby strengthen the construction machine.

SUMMARY OF THE INVENTION

A frame structure of a construction machine according to a first aspect of the present invention is a frame structure of a construction machine on which a cab is mounted that employs a rollover protection structure, and comprises a main frame and a gate frame. The gate frame is a substantially U-shaped member that is installed on the upper portion of the main frame, and includes a pair of columns that extend in a substantially vertical direction, and a beam that is disposed along a substantially horizontal direction so as to connect the upper portions of the pair of columns. In addition, mount units on which the cab is mounted and stopper units that connect the cab and the gate frame are respectively formed on an upper surface of the beam of the gate frame.

Here, a substantially U-shaped gate frame is installed on the main frame on which the engine is mounted. In addition, the mount units for mounting the cab, and the stopper units of the ROPS (rollover protection structure), are arranged on the upper surface of the beam that is disposed along a substantially horizontal direction so as to connect the upper portions of the pair of left and right columns that extend in a vertical direction and form a portion of the gate frame.

With a cab having a ROPS, it will not only be necessary to provide mount units for mounting on the frame, it will also be necessary to provide stopper units that serve to firmly fix the frame to the cab. Thus, when the ROPS of a cab is directly mounted to a conventional frame, it will be necessary to ensure that there is space for the stopper units on the upper portion of the frame.

With the frame structure of a construction machine of the present invention, a substantially U-shaped gate frame is separately arranged on the main frame, and mount units and stopper units of the cab are arranged on the upper surface of the gate frame.

Thus, it will be possible to mount a cab having a ROPS because stopper units and mount units that are needed when mounting a cab having a ROPS can be formed on the upper surface of the beam of the gate frame. In addition, because a cab having a ROPS can be more firmly fixed to the gate frame than when the entire structure of a cab or the like is installed on the main frame, the strength of the entire construction machine can be increased.

The frame structure of a construction machine according to a second aspect of the present invention is the frame structure of a construction machine according to a first aspect, in which a radiator is fixed to the gate frame in a suspended state.

Here, a radiator for cooling the engine mounted on the construction machine is suspended and fixed on the gate frame.

Thus, for example, even when a radiator is installed on the exterior of the engine hood, the radiator can be easily installed on the main frame by fixing the radiator to the substantially U-shaped gate frame so that it is suspended therefrom.

The frame structure of a construction machine according to a third aspect of the present invention is the frame structure of a construction machine according to a second aspect, in which the gate frame is disposed on the rear of the main frame, and the radiator is installed on the rear side of the gate frame.

Here, the radiator is installed on the rear side of the gate frame installed on the rear of the main frame. In other words, the radiator is disposed on the rear of the construction machine.

Thus, for example, because the engine disposed on the front of the main frame can be disposed separately from the radiator, the size of the engine hood that is positioned on the front of the main frame can be reduced and the ability of the operator to see forward can be improved.

The frame structure of a construction machine according to a fourth aspect of the present invention is the frame structure of a construction machine according to any one of the first to third aspects, in which the gate frame is in contact with a portion of a fuel tank and a hydraulic oil tank installed on the main frame.

Here, by installing the fuel tank and the hydraulic oil tank on both right and left sides of the main frame, and placing a portion of each tank in contact with the gate frame, the gate frame can for example be employed to stop vibrations in the direction that the bulldozer moves.

Thus, the fuel tank and the hydraulic oil tank fixed to both left and right sides of the main frame can be firmly installed and fixed in a more stabilized state.

The frame structure of a construction machine according to a fifth aspect of the present invention is the frame structure of a construction machine according to any one of the first to fourth aspects, in which the rear portion of the cab is mounted on the gate frame, and the upper surface of the beam of the gate frame is tilted downward toward the front.

Here, the upper surface of the beam of the gate frame on which the mount units that mount the cab and the stopper units of the ROPS are formed is tilted downward toward the front.

Thus, when the rear portion of the cab is disposed on the gate frame, shocks from the ground when moving forward will can be received in the mount units with good efficiency, and vibrations can be kept to a minimum.

According to the frame structure of a construction machine of the present invention, mounting a cab having a ROPS will be made possible, and the overall strength of the construction machine can be increased.

BRIEF DESCRIPTION OF THE DRAWINGS

Referring now to the attached drawings which form a part of this original disclosure.

DETAILED DESCRIPTION OF THE PREFERRED EMBODIMENTS

FIGS. 1-6 will be employed below to describe a frame structure of a bulldozer (construction machine) 10 according to one embodiment of the present invention. Note that with regard to the terms "front" and "rear" employed in the description below, the term "front" describes the front side of the bulldozer 10, and the term "rear" describes the rear side thereof.

Overall Construction of the Bulldozer 10

Figure 1:
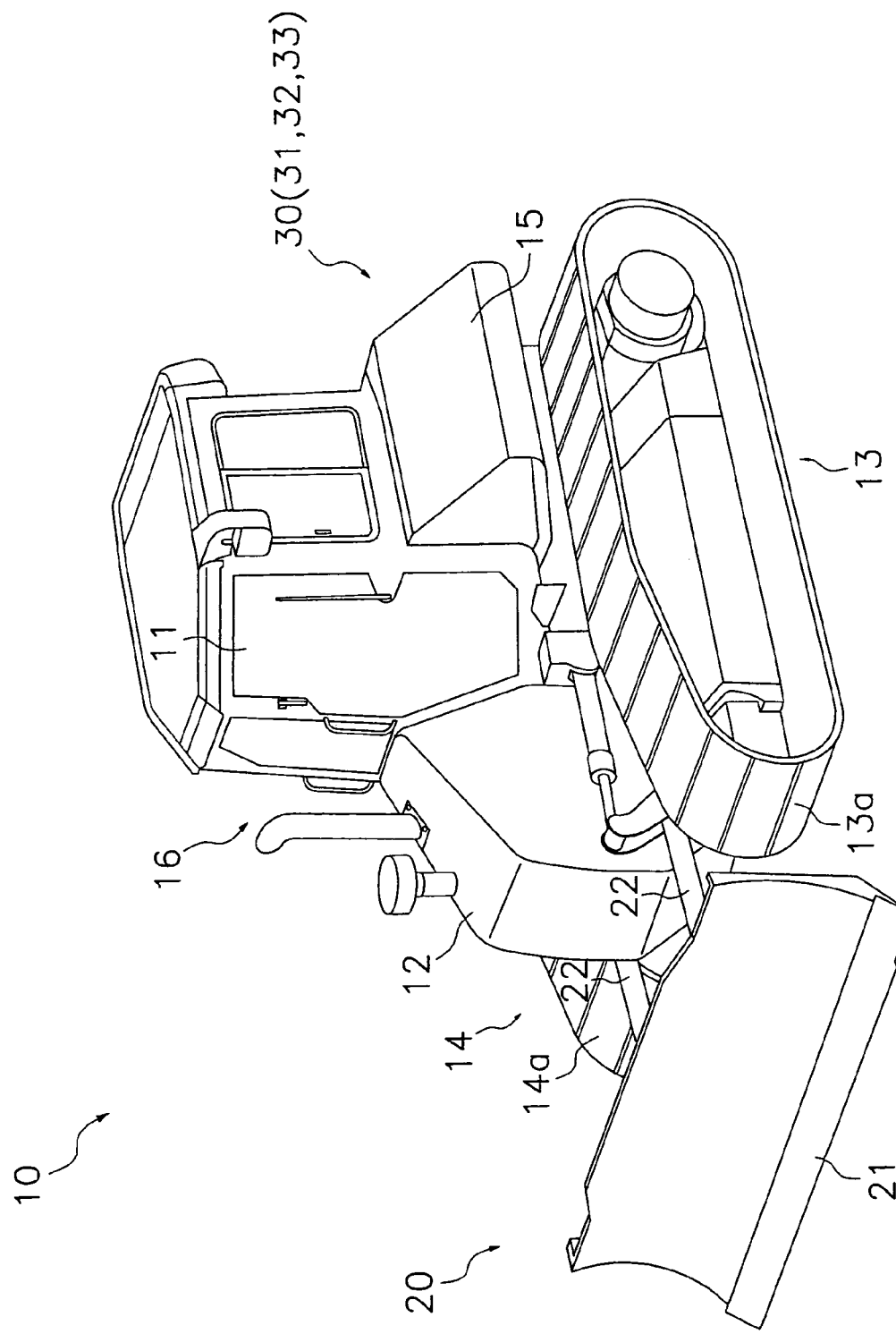
FIG. 1 is a front oblique view of a bulldozer according to an embodiment of the present invention.
Figure 2:
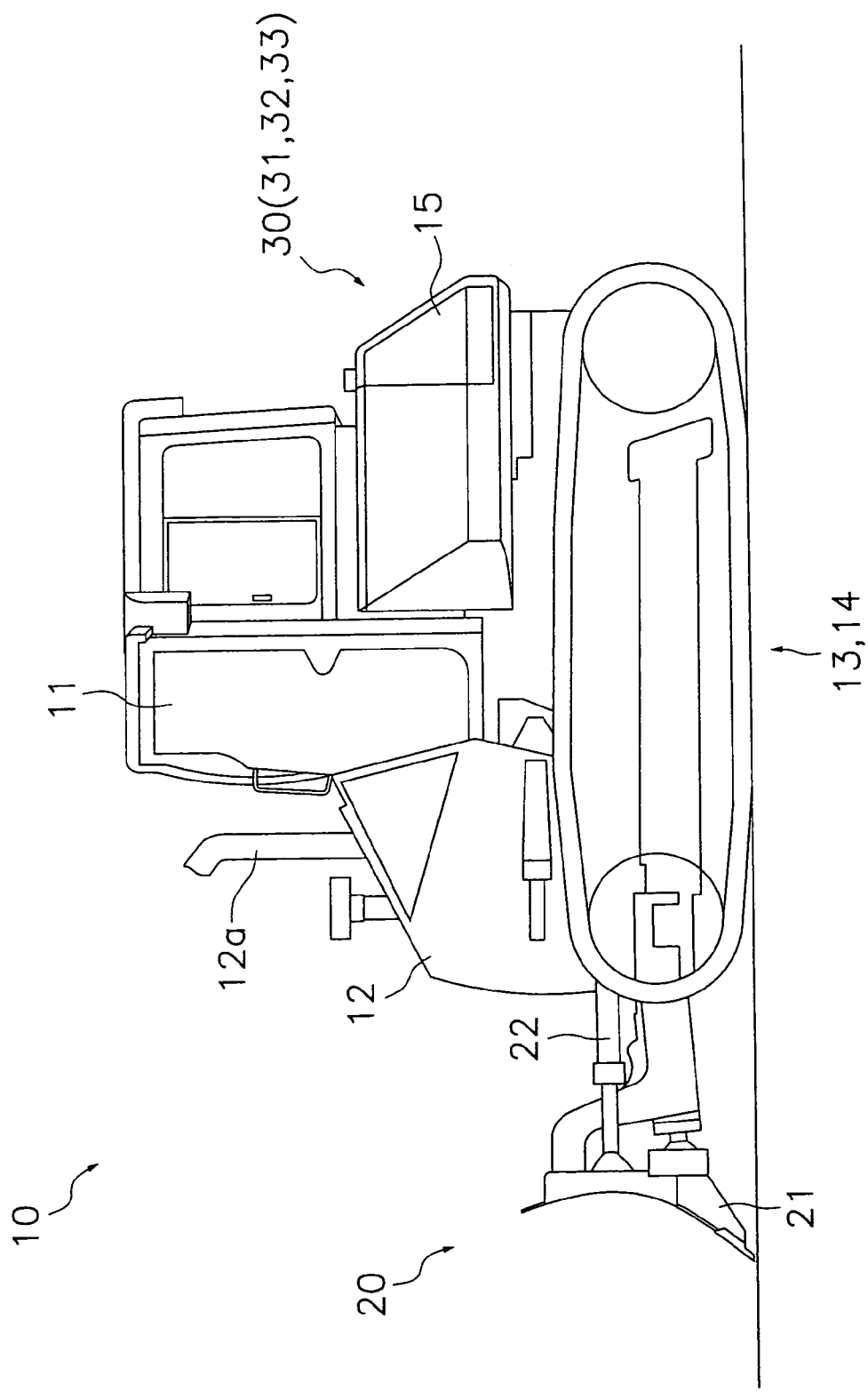
FIG. 2 is a lateral view of the bulldozer shown in FIG. 1.
Figure 3:
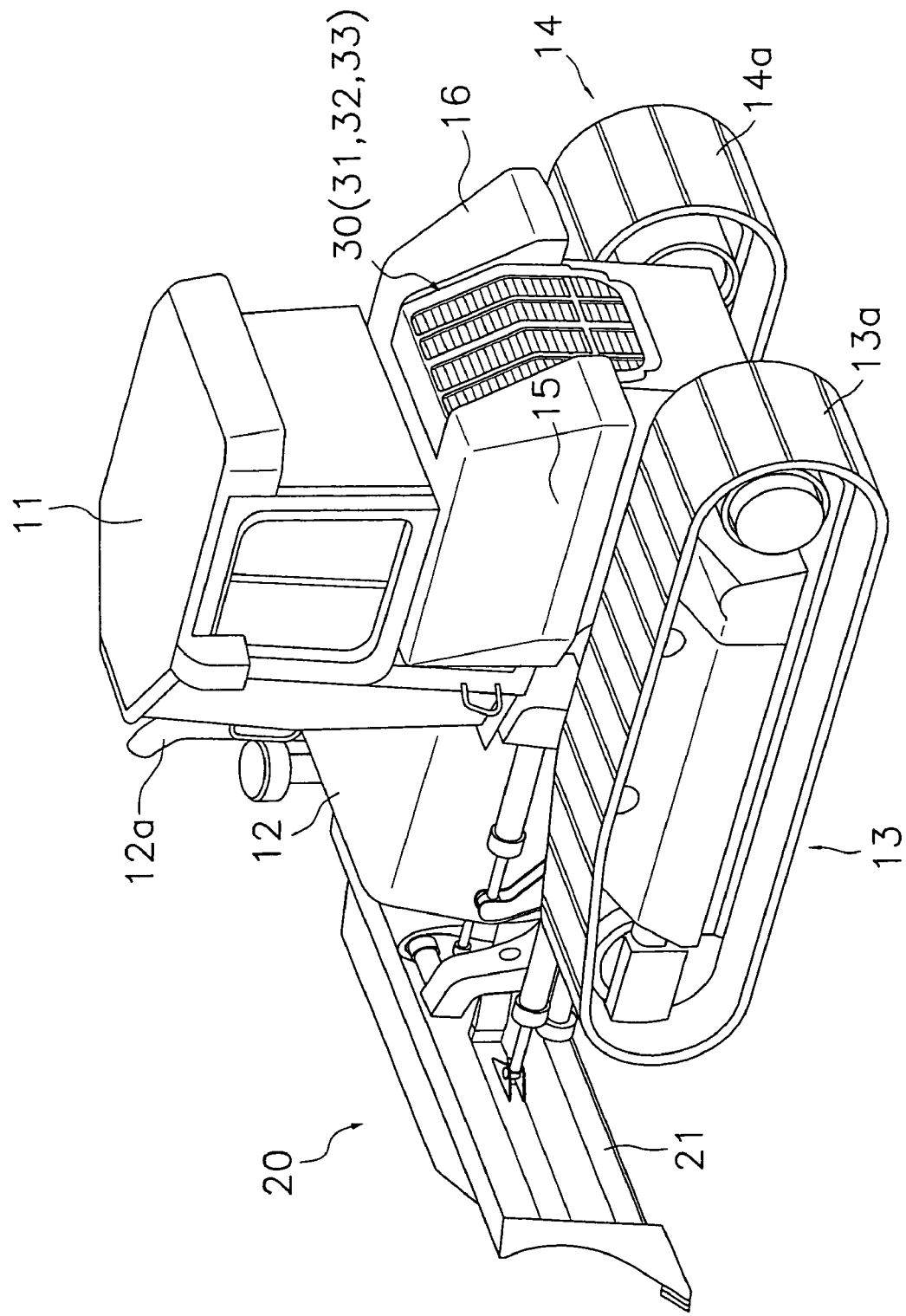
FIG. 3 is a rear oblique view of the bulldozer shown in FIG. 1.
Figure 4:
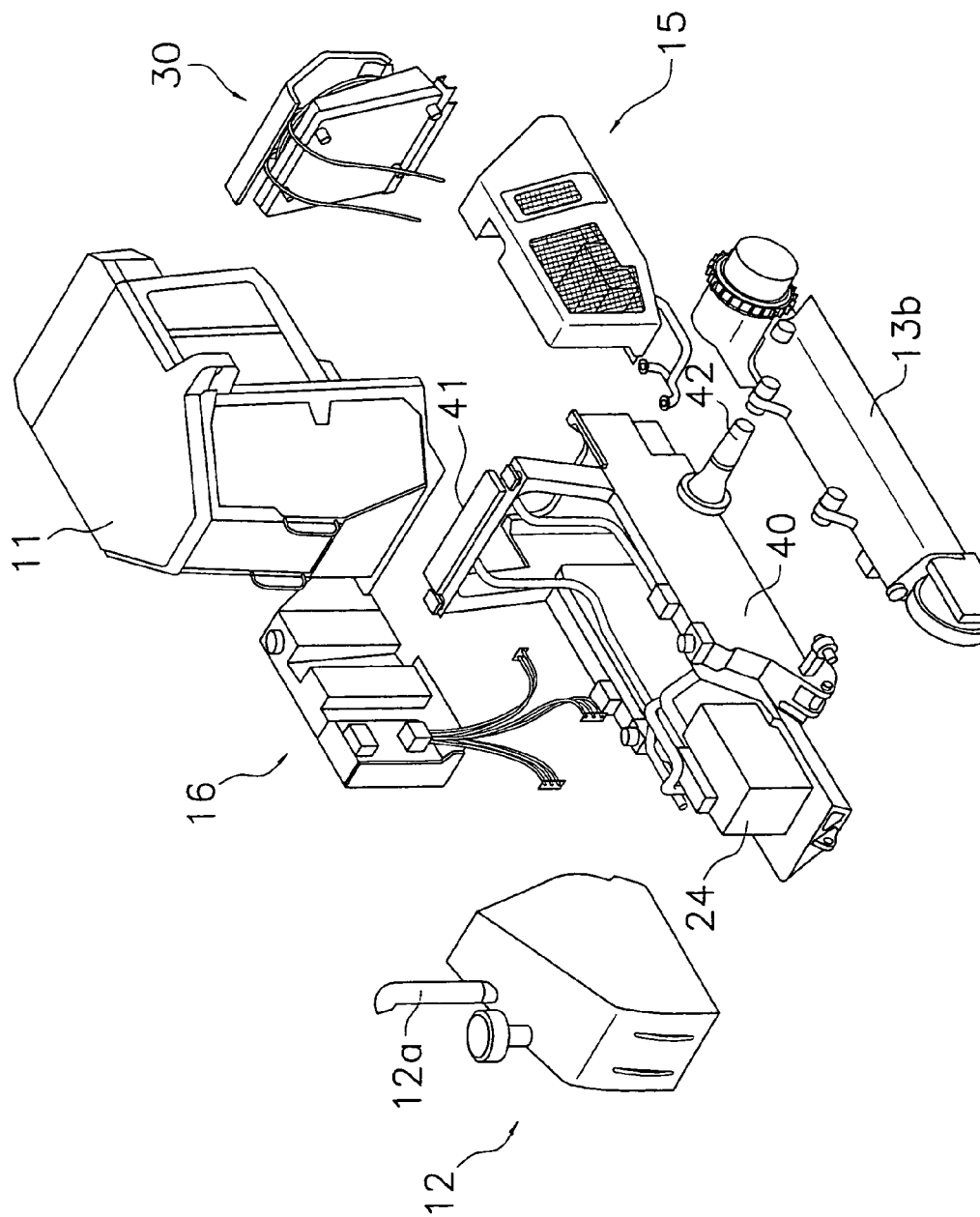
FIG. 4 is a partial oblique view showing a frame structure that comprises the bulldozer shown in FIG. 1.

As shown in FIGS. 1 to 3, the bulldozer 10 of the present embodiment is comprised of a cab (driver's cab) 11, nose module 12, left and right drive devices 13, 14, fuel tank module (fuel tank) 15, a hydraulic oil module (hydraulic oil tank) 16, a work device 20, a radiator module 30, and a main frame 40 (see FIG. 4).

Built into the interior of the cab 11 is a seat for the operator of the bulldozer 10 to sit, and levers, pedals, and gauges for various operations. The cab 11 has a rollover protection structure (hereinafter referred to as a ROPS), and is disposed on the rear of the main frame 40 described below (see FIG. 4).

The nose module 12 accommodates an engine 24 (refer to FIG. 4) in the interior thereof, and is installed forward of the cab 11. The nose module 12 forms a cover structure, and has holes opened therein that allow the air intake port of the air cleaner and the exhaust pipe of the engine 24 to pass therethrough. Because of this, exhaust gas noises of the engine 24 that emanate from the exhaust pipe 12a that projects out from the nose module 12 will be dampened by means of a muffler (not shown the figures), and thus engine noises can be prevented from leaking out, and a bulldozer having little drive noise can be obtained.

In addition, the intrusion of dust and dirt into the nose module 12 is prevented by making the nose module 12 into a cover structure. In this way, friction in the moving parts of the engine 24, such as the pulleys and belts for the alternator and the air conditioner compressor (none of which are shown in the figures), due to dust and dirt will be prevented, and reliability will be improved. Note also that in order to prevent the intrusion of dust and dirt from the air intake port formed in the nose module 12, a pre-cleaner and a filter inside the air cleaner are provided.

Furthermore, the exhaust pipe 12a is installed on the nose module 12 so as to extend upward from the upper surface thereof. In addition, when viewed from the operator inside the cab 11, the exhaust pipe 12a is erected in a position that overlaps with a pillar that forms the cab 11. This prevents a reduction in the ability of the operator inside the cab 11 to see forward due to the exhaust pipe 12a.

The drive devices 13, 14 are installed on both lateral sides of the main frame 40 described below (see FIG. 4), and are capable of driving over irregular surfaces by rotating crawler tracks 13a, 14a having plurality of plate shaped shoes linked together to form an endless ring, and winding them around a plurality of vertically disposed rotating wheels.

The fuel tank module 15 includes a fuel tank on the inner side of the cover. The fuel tank stores fuel that is supplied to the engine 24 (see FIG. 4) mounted in the interior of the nose module 12, and is installed on the left side of the cab 11.

The hydraulic oil module 16 includes a hydraulic oil tank that stores hydraulic oil that is supplied to the transmission system and the work equipment system, and is installed on the right side of the cab 11.

In addition, the radiator module 30 is disposed on the rear of the bulldozer 10 between each of the left and right tank modules 15, 16, and forward of the rear ends of the covers of each of the tank modules 15, 16. Thus, the radiator module 30 can be protected from external obstructions, and the work situation to the rear of the radiator module 30 can be easily confirmed when the operator looks rearward from the cab 11. Because of this, even in situations in which a ripper or a winch is installed on the rear of the bulldozer 10, the work equipment to the rear of the radiator module 30 can be checked from the cab 11 while work is being performed.

The work device 20 has a blade 21 and a hydraulic cylinder 22, and the blade 21 will be tilted and moved in the desired direction by extending and contracting the hydraulic cylinder 22.

The radiator module 30 has a radiator 31, a fan 32, and a motor 33, and cools the engine 24 by rotating the fan 32 by means of the motor 33 to cool the cooling water that flows inside the radiator 31. In addition, the radiator module 30 is to the rear of the cab 11, and is installed on the most rearward end of the main frame 40.

Furthermore, with the bulldozer 10 of the present embodiment, the radiator 31 is separately and independently disposed to the rear of the cab 11 rather than inside the nose module 12. In this way, the size and shape of the nose module 12 can be selected in accordance with its relationship with the engine 24. As a result, the nose module 12 will be reduced in size and the exterior surface thereof will be sloped forward, and thus it will be possible to see beyond the nose module 12 so that the upper portion of the blade 21 is visible from the cab 11, and the forward visibility will be dramatically improved.

Furthermore, the radiator module 30 is disposed more forward (inward) than the rear ends of the fuel tank module 15 and the hydraulic tank module 16 when viewed laterally. Thus, by disposing the radiator module 30 in a position that is recessed forward of the rear ends of the equipment on the left and right sides thereof, damage to the radiator module 30 can be prevented.

The main frame 40 is a base member that forms the skeleton of the bulldozer 10. Items mounted on the main frame 40 include the work device 20 on the front thereof, the drive devices 13, 14 (the track frame modules 13b, 14b) on the left and right sides thereof, and the nose module 12, the gate frame 41 described below (see FIG. 4), the cab 11, the fuel tank module 15, and the hydraulic oil tank module 16 on the upper portion thereof. Note that the frame structure of the bulldozer 10 that includes the main frame 40 will be described below in detail.

Frame Structure of the Bulldozer 10

As shown in FIG. 4, the bulldozer of the present embodiment has a gate frame 41, the nose module 12, the pair of left and right track frame modules 13b, 14b, the fuel tank module 15, the hydraulic oil tank module 16, the radiator module 30, and the cab 11 installed on the main frame 40. Note that in order to simplify the description, the track frame module 14b is not shown. However, it is assumed that the pair of left and right track frame modules 13b, 14b are arranged on both sides of the main frame 40.

Main Frame 40

As shown in FIG. 4, the main frame 40 is a boat shaped frame that is disposed in the center of the bulldozer 10, and the engine 24 is mounted on the front thereof. In addition, the main frame 40 has a pivot shaft 42 on both left and right ends thereof, and the left and right track frame modules 13b, 14b are installed on the pivot shafts 42.

Figure 5:
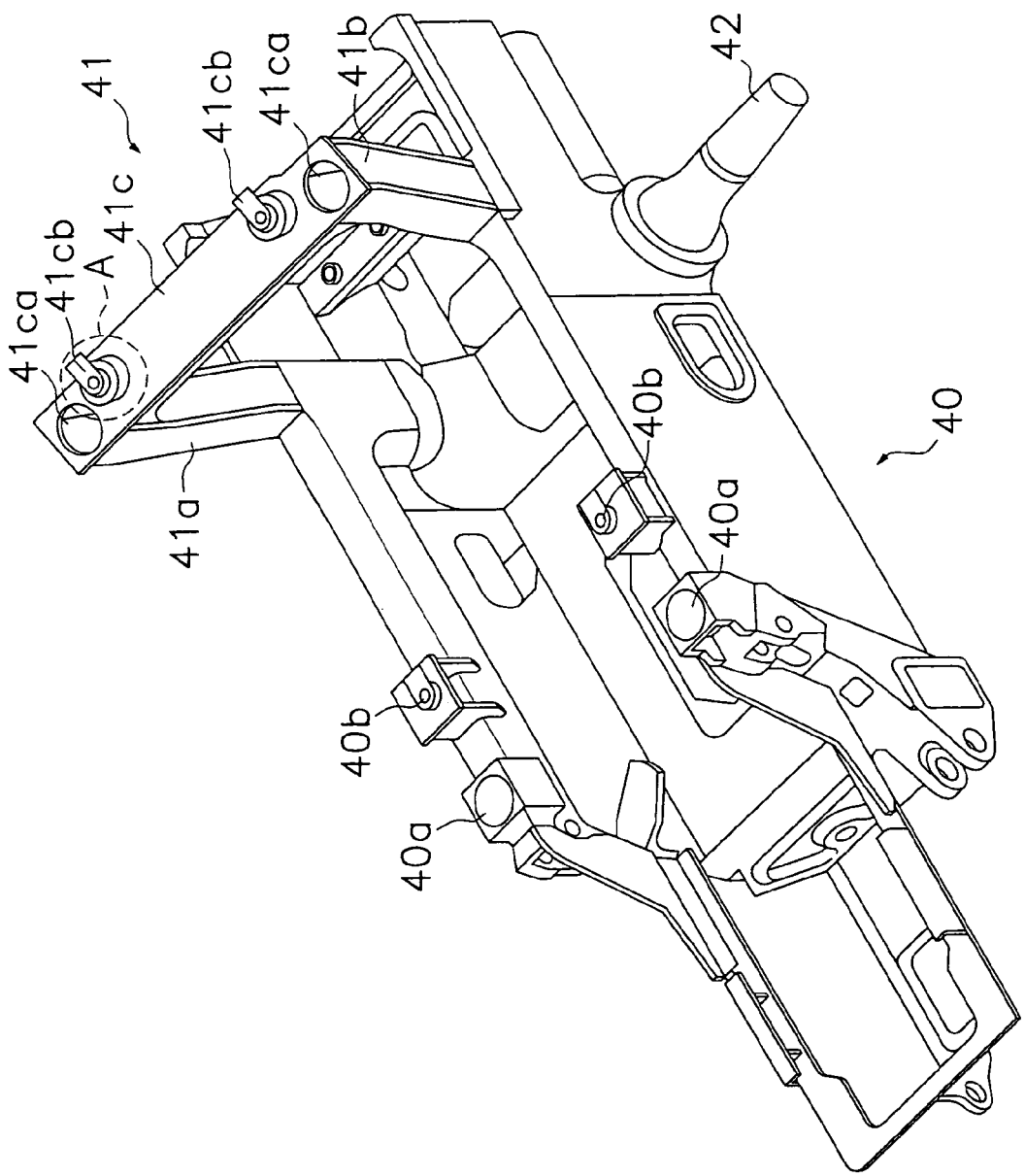
FIG. 5 is an oblique view showing a main frame and a gate frame included in the frame structure of FIG. 4.

Furthermore, as shown in FIG. 5, mount units 40a and stopper units 40b that support the front of the cab 11 are arranged on the main frame 40 on both left and right edges of the boat shape.

The mount units 40a are cab damper mounts on which both ends on the front side of the cab 11 are mounted, and anti-vibration mounts are installed thereon. Because of this, shocks applied to the drive devices 13, 14 while the bulldozer 10 is moving can be buffered, and the transmission of vibrations to the operator inside the cab 11 can be reduced.

The stopper units 40b are arranged in order to strengthen the connection between the cab 11 having the ROPS and a portion of the main frame 40, and increase the strength of the entire vehicle on which the cab 11 is mounted. Note that because the structure of the stopper units 40b is the same as the stopper units 41cb formed on the gate frame 41 described below, the construction of the stopper units 40b, 41cb will be described below in detail with reference to FIG. 6.

Gate Frame 41

As shown in FIG. 5, the gate frame 41 is installed by means of welds in a position that is slightly to the rear of the central portion of the main frame 40 so that the substantially U-shaped opening portion thereof points downward, and forms a portion of the main frame 40. In addition, in order to form a substantially U-shaped gate frame 41, the gate frame 41 has two columns 41a, 41b that are disposed along a substantially vertical direction, and a beam 41c that connects the upper edges of the columns 41a, 41b. Note that the columns 41a, 41b and the beam 41c are made unitary by means of welds.

The columns 41a, 41b are disposed in parallel with each other along a substantially vertical direction. In addition, the lower ends of the columns 41a, 41b are connected by means of welds to portions of both left and right edges of the boat shaped main frame 40. The upper ends of the columns 41a, 41b are respectively connected to both ends of the beam 41c. In this way, the two columns 41a, 41b and the beam 41c are formed into an approximate C-shape.

The beam 41c is disposed along a substantially horizontal direction, in a position that connects the upper ends of the two columns 41a, 41b. Mount units 41ca for mounting the cab 11 are disposed on both ends of the upper surface of the beam 41c. In addition, stopper units 41cb that firmly fix the ROPS cab 11 to the gate frame 41 are disposed on the inner sides of the mount units 41ca on the upper surface of the beam 41c. Furthermore, the upper surface of the beam 41c is tilted downward toward the front of the main frame 40.

The mount units 41ca are cab damper mounts on which both ends on the rear side of the cab 11 are mounted, and anti-vibration mounts are installed thereon. Because of this, shocks applied to the drive devices 13, 14 while the bulldozer 10 is moving can be buffered, and the transmission of vibrations to the operator inside the cab 11 can be reduced. In addition, as noted above, because the upper surface of the beam 41c is tilted downward toward the front of the main frame 40, shocks applied to the drive devices 13, 14 when the bulldozer 10 moves forward can be absorbed with good efficiency by means of the anti-vibration mounts on the mount units 41c, and the transmission of vibrations to the operator inside the cab 11 can be further effectively reduced. Note that the front side of the cab 11 is mounted on the mount units 40a (see FIG. 5) arranged on the upper surface of the main frame 40 described above, and is firmly fixed to the stopper units 40b (see FIG. 5) arranged on the upper surface of the same main frame 40.

Figure 6:
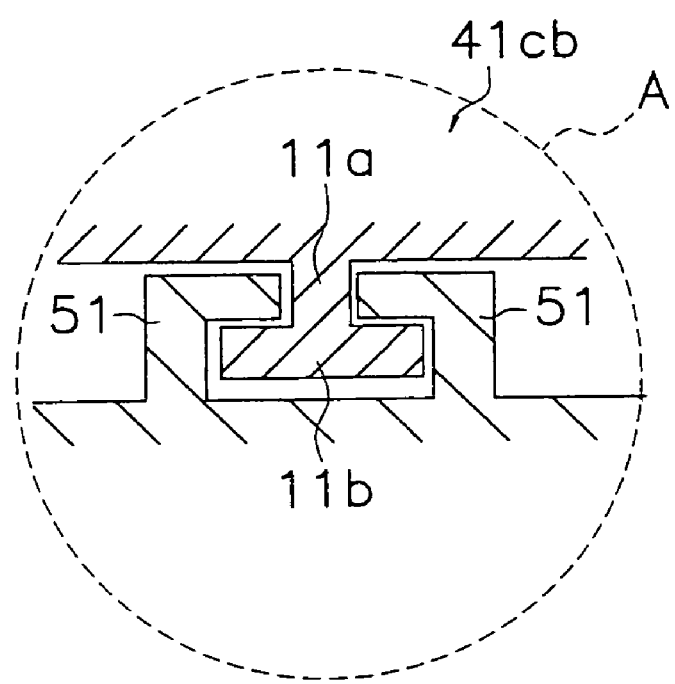
FIG. 6 is an enlarged cross sectional view of the A portion of FIG. 5.

As shown in FIG. 6, each stopper unit 41cb has a claw 51 that serves to grasp a projection 11a that projects from the bottom surface of the cab 11. The projection 11a that projects from the bottom surface of the cab 11 has a disk shaped plate 11b on the tip portion thereof, and is structured so that a portion of the plate 11b will be retained by the claw 51 of the stopper unit 41cb. Thus, by strengthening the connection between the cab 11 and the gate frame 41 that forms a portion of the main frame 40 with the stopper units 41cb, the strength of the entire vehicle on which the cab 11 having the ROPS is mounted can be increased. Note that even with regard to the stopper units 40b arranged on the main frame 40, except for the fact that the front side of the cab 11 is mounted thereon, the same effects can be obtained because the stopper units 41cb have the same construction.

In addition, as shown in FIG. 4, the radiator module 30 is installed on the rear side of the gate frame 41 so as to be suspended therefrom.

Thus, by erecting a substantially U-shaped gate frame 41 on the upper portion of the boat shaped main frame 40, the installation of the radiator module 30 can be simplified.

Furthermore, as shown in FIG. 4, the fuel tank module 15 and the hydraulic oil tank module 16 arranged on both left and right sides of the main frame 40 are installed on both left and right sides of the gate frame 41 so that portions thereof are in contact therewith.

In this way, the gate frame 41 can be employed as a vibration prevention member of the fuel tank module 15 and the hydraulic oil tank module 16. Thus, the fuel tank module 15 and the hydraulic oil tank module 16 can be firmly installed on the main frame 40 in a more stabilized state.

Special Characteristics of the Frame Structure of the Bulldozer 10

(1) As shown in FIG. 4, the bulldozer 10 of the present embodiment comprises a boat shaped main frame 40 and a substantially U-shaped gate frame 41 as a frame structure on which the cab 11 having the ROPS is mounted and which forms the skeleton of the bulldozer 10. As shown in FIG. 5, the gate frame 41 is installed on the upper portion of the main frame 40, and has a pair of left and right columns 41a, 41b that are disposed along a substantially vertical direction, and a beam 41c that connects the upper ends of the columns 41a, 41b. In addition, mount units 41ca for mounting the cab 11, and stopper units 41cb for firmly grasping the cab 11, are arranged on the upper surface of the beam 41c.

Thus, the mount units 41ca and the stopper units 41cb needed to mount the cab 11 having a ROPS can be arranged on the beam 41cb on the gate frame 41. As a result, the strength of the entire bulldozer 10 can be increased because a highly rigid cab 11 can be mounted thereon, and because the connections between the cab 11 and the gate frame 41 that functions as a portion of the main frame 40 can be strengthened.

(2) As shown in FIG. 4, with the bulldozer 10 of the present embodiment, the radiator module 30 is disposed on and fixed to the gate frame 41 so as to be suspended therefrom.

Thus, installing the radiator module 30 on the gate frame 41 that functions as a portion of the main frame 40, the radiator module can be more easily and firmly fixed to the main frame 40 than with a conventional frame structure having only a boat shaped main frame 40.

(3) As shown in FIG. 4, with the bulldozer 10 of the present embodiment, the gate frame 41 is installed slightly to the rear of the central portion of the main frame 40. In addition, the radiator module 30 is fixed to the rear side of the gate frame 41 so as to be suspended therefrom.

Thus, like in the present embodiment, even when the engine 24 and the radiator 31 are disposed separately, the module 30 that includes the radiator 31 can be easily installed on the gate frame 41 that forms a portion of the main frame 40. In addition, by disposing the radiator module 30 in a rearward position that is separated from the engine 24 as noted above, the nose module 12 that accommodates the engine 24 can be reduced in size, the ability of the operator inside the cab 11 to see forward can be improved, and thus work efficiency can be dramatically improved.

Furthermore, because the radiator module 30 separately disposed to the rear of the engine 24 is a thin module that accommodates only the radiator 31, the fan 32, and the motor 33 in the interior thereof, rearward visibility can also be ensured.

(4) With the bulldozer 10 of the present embodiment, the fuel tank module 15 and the hydraulic oil tank module 16 installed on both left and right ends of the main frame 40 are installed so as to be in respective contact with both left and right ends of the gate frame 41.

Thus, each tank module 15, 16 installed on the main frame 40 can be firmly installed on the main frame 40 in a more stabilized state.

(5) With the bulldozer 10 of the present embodiment, the upper surface of the beam 41c that forms a portion of the gate frame 41 is tilted downward toward the front of the main frame 40.

Thus, by tilting the mount units 41ca disposed on the upper surface of the beam 41c downward toward the front of the main frame 40, shocks applied from the ground to the drive devices 13, 14 during the forward movement of the bulldozer 10 can be absorbed with greater efficiency. This can reduce the vibrations and shocks transmitted to the operator inside the cab 11 during operation, and provide a bulldozer that rides smoothly.

Other Embodiments

An embodiment of the present invention was described above, however the present invention is not limited to the aforementioned embodiment, and various modifications thereof are possible within a range that does not depart from the essence of the invention.

(A) In the aforementioned embodiment, the gate frame 41 is installed to the rear of the central portion of the boat shaped main frame 40. However, the present invention is not limited to this configuration.

For example, the gate frame may also be installed on the rear end of the main frame. Even with this configuration, the radiator module, each tank module, and the like can be easily installed on the frame, and like the embodiment described above, can provide a frame structure having increased strength.

(B) With the aforementioned embodiment, the columns 41a, 41b of the gate frame 41 on which the mount units 41ca are disposed are disposed along a substantially vertical direction. However, the present invention is not limited to this configuration.

Figure 7:
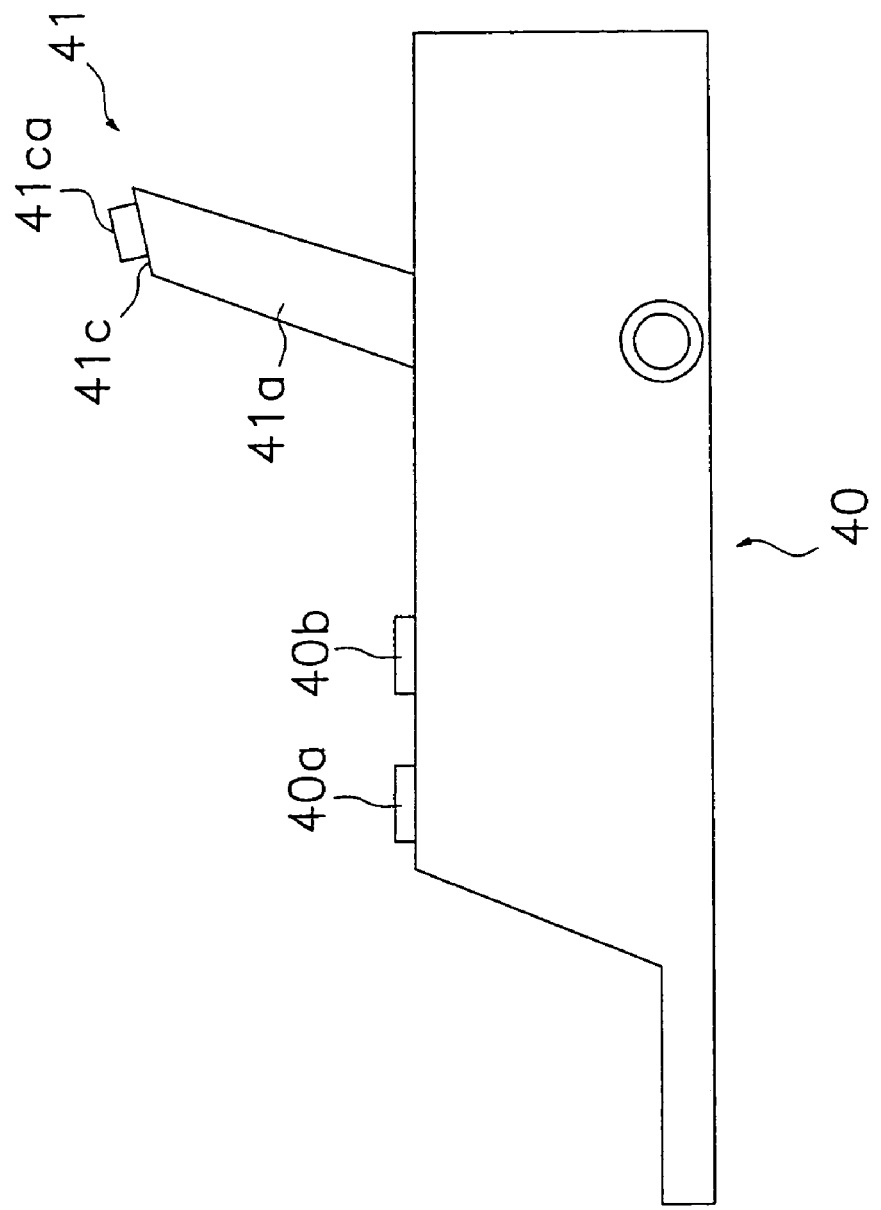
FIG. 7 is an oblique view showing a frame structure that comprises a bulldozer according to another embodiment of the present invention.

For example, if the upper surface of the beam 41c (the mount units 41ca) is tilted downward toward the front of the main frame 40, then as shown in FIG. 7, the columns 41a, 41b of the gate frame 41 may be installed so as to tilt rearward. Even with this configuration, shocks applied to the drive devices 13, 14 during the operation of the bulldozer 10 can be received by the mount units 41ca, and shocks and vibrations can be absorbed with greater efficiency.

(C) In the aforementioned embodiment, the radiator module 30 and the like is fixed to the gate frame 41 so as to be suspended therefrom. However, the present invention is not limited to this configuration.

For example, modules other than the radiator module described in the aforementioned embodiment may also be installed on the gate frame 41.

(D) With the aforementioned embodiment, portions of the fuel tank module 15 and the hydraulic oil tank module 16 are fixed to the gate frame 41. However, the present invention is not limited to this configuration.

It is not necessary for portions of the fuel tank module 15 and the hydraulic oil tank module 16 to be fixed to a portion of the gate frame 41, e.g., they may be in contact therewith in the forward direction of the bulldozer 10. Even with this configuration, by restricting the movement of each tank module 15, 16 in the forward direction by means of the gate frame 41, the gate frame 41 can function as a means of stopping the vibration of each tank module 15, 16.

(E) In the aforementioned embodiment, the present invention was applied to a frame structure of a bulldozer. However, the present invention is not limited to this configuration.

For example, the present invention can be applied to a frame structure that forms a portion of a construction machine other than a bulldozer, such as a wheel loader, a hydraulic shovel, and the like.

INDUSTRIAL APPLICABILITY

Because the frame structure of a construction machine of the present invention has stopper units and mount units formed on the upper surface of the frame which serve to fix a cab having a ROPS thereto and thereby provide a strong frame structure, the present invention can be widely applied to frame structures of construction machines other than bulldozers.

What is claimed is:

1. A frame structure for a construction machine that mounts a cab employing a rollover protection structure, comprising:
   a main frame; and
   a substantially U-shaped gate frame that is installed on an upper portion of the main frame, and has a pair of columns that extend in a substantially vertical direction, and a beam that is disposed along a substantially horizontal direction so as to connect upper portions of the pair of columns;
   wherein mount units which mount the cab, and stopper units that are disposed adjacent to the mounts units and connect the cab and the gate frame in an undetachable state, are respectively formed on an upper surface of the beam of the gate frame.

2. A frame structure for a construction machine that mounts a cab employing a rollover protection structure, comprising:
   a main frame; and
   a substantially U-shaped gate frame that is installed on an upper portion of the main frame, and has a pair of columns that extend in a substantially vertical direction, and a beam that is disposed along a substantially horizontal direction so as to connect upper portions of the pair of columns;
   wherein mount units which mount the cab, and stopper units that connect the cab and the gate frame, are respectively formed on an upper surface of the beam of the gate frame, and
   wherein a radiator is fixed to the gate frame in a suspended state.

3. The frame structure of a construction machine according to claim 2, wherein the gate frame is disposed on the rear of the main frame, and the radiator is installed on the rear side of the gate frame.

4. A frame structure for a construction machine that mounts a cab employing a rollover protection structure, comprising:
   a main frame; and
   a substantially U-shaped gate frame that is installed on an upper portion of the main frame, and has a pair of columns that extend in a substantially vertical direction, and a beam that is disposed along a substantially horizontal direction so as to connect upper portions of the pair of columns;
   wherein mount units which mount the cab, and stopper units that connect the cab and the gate frame, are respectively formed on an upper surface of the beam of the gate frame, and
   wherein the gate frame is in contact with a portion of a fuel tank and a hydraulic oil tank installed on the main frame.

5. The frame structure of a construction machine according to claim 1, wherein the rear portion of the cab is mounted on the gate frame; and
   the upper surface of the beam of the gate frame is tilted downward toward the front.

6. The frame structure of a construction machine according to claim 2, wherein the gate frame is in contact with a portion of a fuel tank and a hydraulic oil tank installed on the main frame.

7. The frame structure of a construction machine according to claim 3, wherein the gate frame is in contact with a portion of a fuel tank and a hydraulic oil tank installed on the main frame.

8. The frame structure of a construction machine according to claim 2, wherein the rear portion of the cab is mounted on the gate frame; and
   the upper surface of the beam in the gate frame is tilted downward toward the front.

9. The frame structure of a construction machine according to claim 3, wherein the rear portion of the cab is mounted on the gate frame; and
   the upper surface of the beam in the gate frame is tilted downward toward the front.

10. The frame structure of a construction machine according to claim 4, wherein the rear portion of the cab is mounted on the gate frame; and
    the upper surface of the beam in the gate frame is tilted downward toward the front.

11. The frame structure of a construction machine according to claim 1, further comprising:
    second mount units, which mount the cab, and second stopper units that are disposed adjacent to the second mount units and connect the cab and the main frame in an undetachable state, respectively formed on an upper surface of the main frame.

* * * * *